(12) United States Patent
Lee et al.

(10) Patent No.: US 8,040,960 B2
(45) Date of Patent: Oct. 18, 2011

(54) METHOD FOR TRANSMITTING SIGNAL IN WIRELESS COMMUNICATION SYSTEM

(75) Inventors: Sang-Min Lee, Suwon-si (KR); Myeon-Gyun Cho, Seongnam-si (KR); Yu-Seok Kim, Seoul (KR); Keum-Chan Whang, Seoul (KR); Jae-Won Kang, Seoul (KR); Sun-Young Lee, Seoul (KR)

(73) Assignees: Samsung Electronics Co., Ltd., Suwon-si (KR); Industry-Academic Cooperation Foundation, Seoul (KR)

( * ) Notice: Subject to any disclaimer, the term of this patent is extended or adjusted under 35 U.S.C. 154(b) by 1021 days.

(21) Appl. No.: 11/981,981

(22) Filed: Oct. 31, 2007

(65) Prior Publication Data

US 2008/0101491 A1    May 1, 2008

(30) Foreign Application Priority Data

Oct. 31, 2006    (KR) .................. 10-2006-0106365

(51) Int. Cl.
*H04K 1/10*    (2006.01)
(52) U.S. Cl. ........ 375/260; 375/261; 375/130; 375/267; 375/340; 370/208; 370/203; 370/210

(58) Field of Classification Search .................. 375/260, 375/261, 340, 267, 130; 370/315, 208, 203, 370/210
See application file for complete search history.

(56) References Cited

U.S. PATENT DOCUMENTS

| | | | |
|---|---|---|---|
| 7,668,075 B2 * | 2/2010 | Hosur et al. ................. | 370/208 |
| 2006/0274846 A1 * | 12/2006 | Bauch ........................... | 375/267 |
| 2007/0058756 A1 * | 3/2007 | Mahadevappa et al. ...... | 375/340 |
| 2007/0081484 A1 * | 4/2007 | Wang ............................ | 370/315 |

FOREIGN PATENT DOCUMENTS

KR    1020060097721 A    9/2006

* cited by examiner

*Primary Examiner* — Eva Puente (57) ABSTRACT

A method for transmitting a signal in a wireless communication system. The method comprises the steps of: grouping two subcarriers having different channel characteristics; identifying a number of all cases occurring when either equal symbols or different symbols, among symbols determined upon applying a first modulation scheme, are mapped to the two subcarriers; and mapping two subcarriers corresponding to each of the number of all cases to one symbol according to a second modulation scheme, and transmitting the signal, wherein a modulation order of the second modulation scheme is two times higher than a modulation order of the second modulation.

11 Claims, 8 Drawing Sheets

| | | | |
|---|---|---|---|
| $C_{13}$ | $C_9$ | $C_5$ | $C_1$ |
| •  | •  | •  | •  |
| $(-3/\sqrt{10}, 3/\sqrt{10})$ | $(-1/\sqrt{10}, 3/\sqrt{10})$ | $(1/\sqrt{10}, 3/\sqrt{10})$ | $(3/\sqrt{10}, 3/\sqrt{10})$ |
| $C_{14}$ | $C_{10}$ | $C_6$ | $C_2$ |
| •  | •  | •  | •  |
| $(-3/\sqrt{10}, 1/\sqrt{10})$ | $(-1/\sqrt{10}, 1/\sqrt{10})$ | $(1/\sqrt{10}, 1/\sqrt{10})$ | $(3/\sqrt{10}, 1/\sqrt{10})$ |
| •  | •  | •  | •  |
| $(-3/\sqrt{10}, -1/\sqrt{10})$ | $(-1/\sqrt{10}, -1/\sqrt{10})$ | $(1/\sqrt{10}, -1/\sqrt{10})$ | $(3/\sqrt{10}, -1/\sqrt{10})$ |
| $C_{15}$ | $C_{11}$ | $C_7$ | $C_3$ |
| •  | •  | •  | •  |
| $(-3/\sqrt{10}, -3/\sqrt{10})$ | $(-1/\sqrt{10}, -1/\sqrt{10})$ | $(1/\sqrt{10}, -3/\sqrt{10})$ | $(3/\sqrt{10}, -3/\sqrt{10})$ |
| $C_{16}$ | $C_{12}$ | $C_8$ | $C_4$ |

- Difference between 1st and 2nd subcarriers is 0°/180°
- Difference between 1st and 2nd subcarriers is 90°
- Difference between 1st and 2nd subcarriers is 270°

METHOD FOR TRANSMITTING SIGNAL IN WIRELESS COMMUNICATION SYSTEM

CROSS-REFERENCE TO RELATED APPLICATION(S) AND CLAIM OF PRIORITY

The present application claims priority to application entitled "Method For Transmitting Signal In Wireless Communication System" filed with the Korean Intellectual Property Office on Oct. 31, 2006 and assigned Serial No. 2006-106365, the contents of which are incorporated herein by reference.

TECHNICAL FIELD OF THE INVENTION

The present invention relates to a wireless communication system, and more particularly to a method for transmitting signals in a wireless communication system.

BACKGROUND OF THE INVENTION

In a wireless communication system, base stations and mobile stations transmit signals in consideration of a channel coding scheme and a diversity gain in order to achieve reliable communication at a high speed.

Tarokh suggested space-time block coding for communication in a Rayleigh fading channel by means of multiple transmission antennas. Alamouti suggested a method capable of a diversity gain, with a system using two transmission antennas as a model.

Meanwhile, currently, an Orthogonal Frequency Division Multiple Access (OFDMA) scheme is being discussed as a wireless transmission scheme for the next-generation wireless mobile communication system.

According to the OFDMA scheme, a base station allocates a different number of subcarriers depending on data rates required by mobile stations, thereby efficiently distributing resources. In addition, the OFDMA scheme is suitable for a communication system using a large number of subcarriers, and can be efficiently used in a system having a wide area cell where a time delay spread is large.

However, since signals are mapped in units of symbols for each mobile station in a wireless communication system using the OFDMA scheme, it is impossible to obtain a diversity gain unless a channel coding is performed. Moreover, even though a channel coding is performed in the wireless communication system, only a small amount of diversity gain can be obtained. In order to maximize the diversity gain, it is necessary to use multiple antennas. However, when multiple antennas are used, there is a problem in that the configuration of a receiver is more complicated in order to remove interference between antennas.

SUMMARY OF THE INVENTION

To address the above-discussed deficiencies of the prior art, it is a primary object of the present invention to solve the above-mentioned problems occurring in the prior art, and the present invention provides a signal transmission method capable of maximizing a diversity gain without multiple antennas in a wireless communication system.

In addition, the present invention provides a signal transmission method capable of maximizing a diversity gain in a frequency selective channel through symbol sharing in a wireless communication system.

In accordance with an aspect of the present invention, there is provided a method for transmitting a signal in a wireless communication system, the method comprising the steps of: grouping two subcarriers having different channel characteristics; identifying a number of all cases occurring when either equal symbols or different symbols, among symbols determined upon applying a first modulation scheme, are mapped to the two subcarriers; and mapping two subcarriers corresponding to each of the number of all cases to one symbol according to a second modulation scheme, and transmitting the signal, wherein a modulation order of the second modulation scheme is two times higher than a modulation order of the second modulation.

In accordance with another aspect of the present invention, there is provided a method for transmitting a signal in a wireless communication system, the method comprising the steps of: grouping two subcarriers having different channel characteristics; identifying a number of all cases occurring when either equal symbols or different symbols among symbols determined upon applying a quadrature phase shift keying (QPSK) modulation scheme are mapped to the two subcarriers; when a phase difference between a first symbol mapped to a first subcarrier and a second symbol mapped to a second subcarrier according to the application of the QPSK modulation scheme is 90 degrees, transmitting a signal with no symbol mapped to the second subcarrier after shifting a phase of the first symbol by 45 degrees; and when a phase difference between the first symbol and the second subcarrier upon the application of the QPSK modulation scheme is 270 degrees, transmitting a signal with no symbol mapped to the first subcarrier after shifting a phase of the second symbol mapped to the second subcarrier by 45 degrees.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a method for transmitting a signal in such a manner as to group at least two subcarriers into a group, and to apply a preset mapping rule, i.e., a new constellation, to each subcarrier according to each group in consideration of a case where a symbol is mapped to the subcarrier. Here, it is preferred that subcarriers having different channel states are grouped into a group.

The following description will be given about an example in which subcarriers having two different channel states are grouped into one group. The present invention can be applied to all communication systems which perform a modulation operation, and particularly can be preferably applied to a wireless communication system employing an Orthogonal Frequency Division Multiple Access (OFDMA) scheme.

Phase shift keying (PSK) and quadrature amplitude modulation (QAM) are the most widely used modulation schemes. The modulation schemes may be normalized as shown in equation 1.

$$S_i(t) = \sqrt{\frac{2E}{T}} \exp(w_o t + 2\pi i / M) \quad (1)$$

In equation 1, the "M" represents a modulation order.

Figure 1:
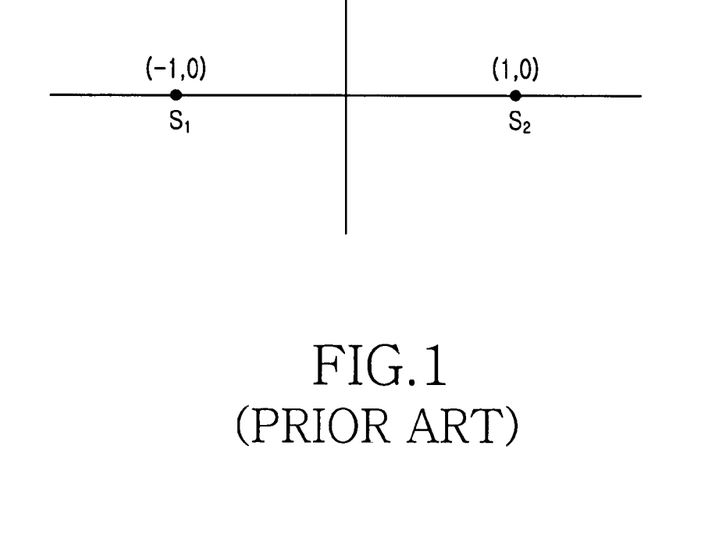
FIG. 1 is a view illustrating a constellation of a conventional BPSK modulation scheme.
Figure 2:
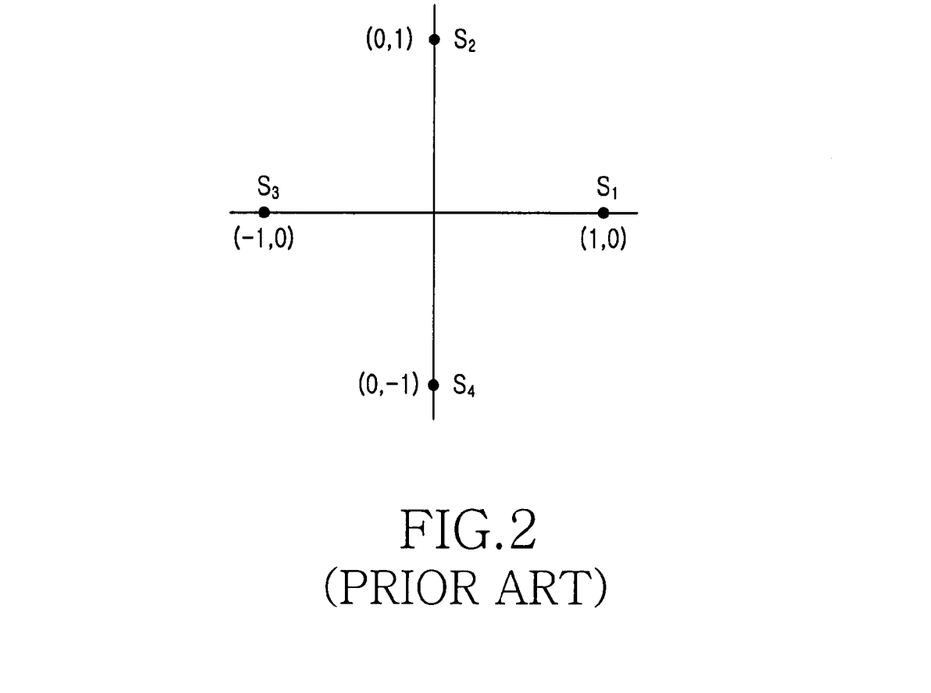
FIG. 2 is a view illustrating a constellation of a conventional QPSK modulation scheme.

When equation 1 is divided into a real component (In-phase) and an imaginary component (Quadrature), and the divided components are expressed by a constellation of binary phase shift keying (BPSK) and a constellation of quaternary phase shift keying (QPSK), the constellations are shown as FIGS. 1 and 2, respectively.

FIG. 1 is a view illustrating a constellation of a conventional BPSK modulation scheme, and FIG. 2 is a view illustrating a constellation of a conventional QPSK modulation scheme. As shown in FIGS. 1 and 2, the BPSK modulation scheme maps one 1-bit symbol to one subcarrier, and the QPSK modulation scheme maps one 2-bit symbol to one subcarrier.

However, as described above, the present invention groups two subcarriers having mutually different channel states into one group when each symbol is mapped to each subcarrier. Here, it is assumed that symbol "k" mapped to a $j^{th}$ subcarrier in Group i is defined as shown in equation 1.

$S_{i,j,k}$: symbol k mapped to $j^{th}$ subcarrier in Group i $$i \in I, I = \left\{ n \mid 1 \leq n \leq \frac{\text{total subcarrier}}{2} \right\} \quad (2)$$

$$j \in \{1, 2\}$$

$$k \in \{n \mid 1 \leq n \leq 2^{\text{modulation order}}\}$$

When a symbol modulation scheme used for the group is the BPSK, the number of cases where a symbol is mapped to subcarriers in the group is four, as shown in Table 1 below.

TABLE 1

| | | $1^{st}$ subcarrier in $i^{th}$ group | $2^{nd}$ subcarrier in $i^{th}$ group |
|---|---|---|---|
| Same information is loaded on $1^{st}$ and $2^{nd}$ subcarriers | Case 1 | $S_{i,1,1}$ | $S_{i,2,1}$ |
| | Case 2 | $S_{i,1,2}$ | $S_{i,2,2}$ |
| Different pieces of information are loaded on $1^{st}$ and $2^{nd}$ subcarriers | Case 3 | $S_{i,1,1}$ | $S_{i,2,2}$ |
| | Case 4 | $S_{i,1,2}$ | $S_{i,2,1}$ |

Figure 3:
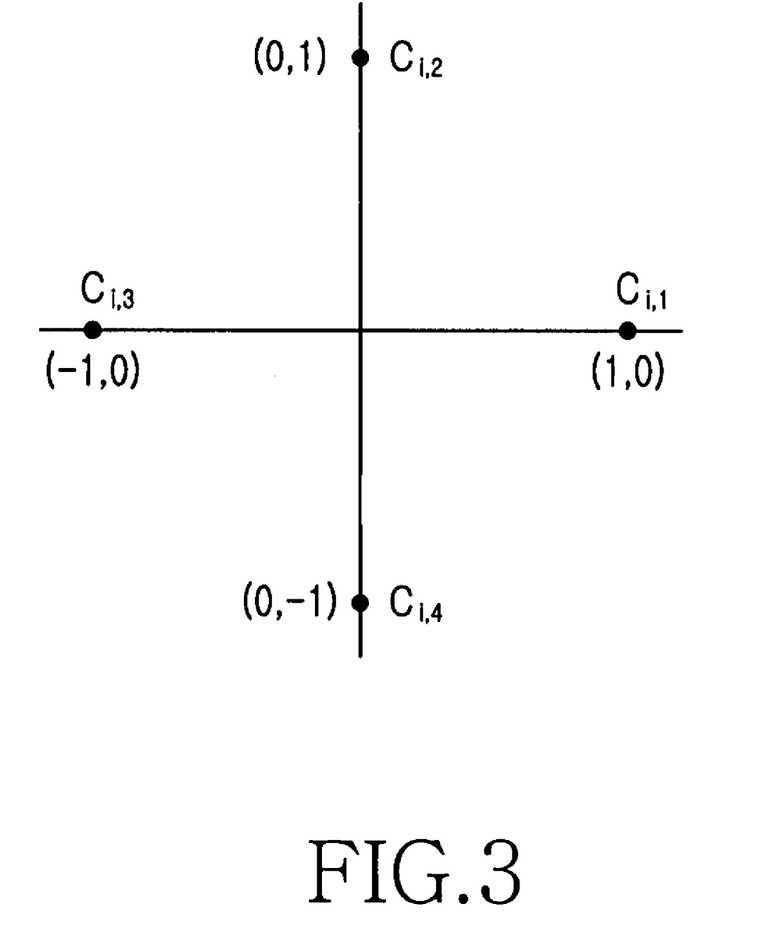
FIG. 3 is a view illustrating a QPSK constellation used for a BPSK modulation according to a first embodiment of the present invention.

FIG. 3 is a view illustrating a QPSK constellation used for a BPSK modulation according to a first embodiment of the present invention.

According to the present invention, the QPSK constellation is used as a constellation to be applied to the four cases shown in Table 1. That is, the QPSK constellation may be used for BPSK modulation.

When symbols loaded on subcarriers in the $i^{th}$ group correspond to Case 1, both subcarriers in the group are mapped to symbol $C_{i,1}$ in FIG. 3. In the case of Case 2, both subcarriers in the group are mapped to symbol $C_{i,3}$. In the case of Case 3, both subcarriers in the group are mapped to symbol $C_{i,4}$. In the case of Case 4, both subcarriers in the group are mapped to symbol $C_{i,2}$. A symbol mapping for each Case is based on a 2-bit Gray coding scheme.

That is, while a conventional BPSK modulation scheme maps one symbol to one subcarrier, the BPSK modulation scheme according to the present invention maps one symbol to one subcarrier, and maps such two subcarriers to one modulation symbol.

Meanwhile, when a symbol loaded on subcarriers in the $i^{th}$ group is based on the QPSK, the number of cases where a symbol is mapped to subcarriers in the group is sixteen. Therefore, a 16QAM constellation is used for symbol transmission for the 16 cases. That is, the 16QAM constellation may be used for QPSK modulation.

Figure 4:
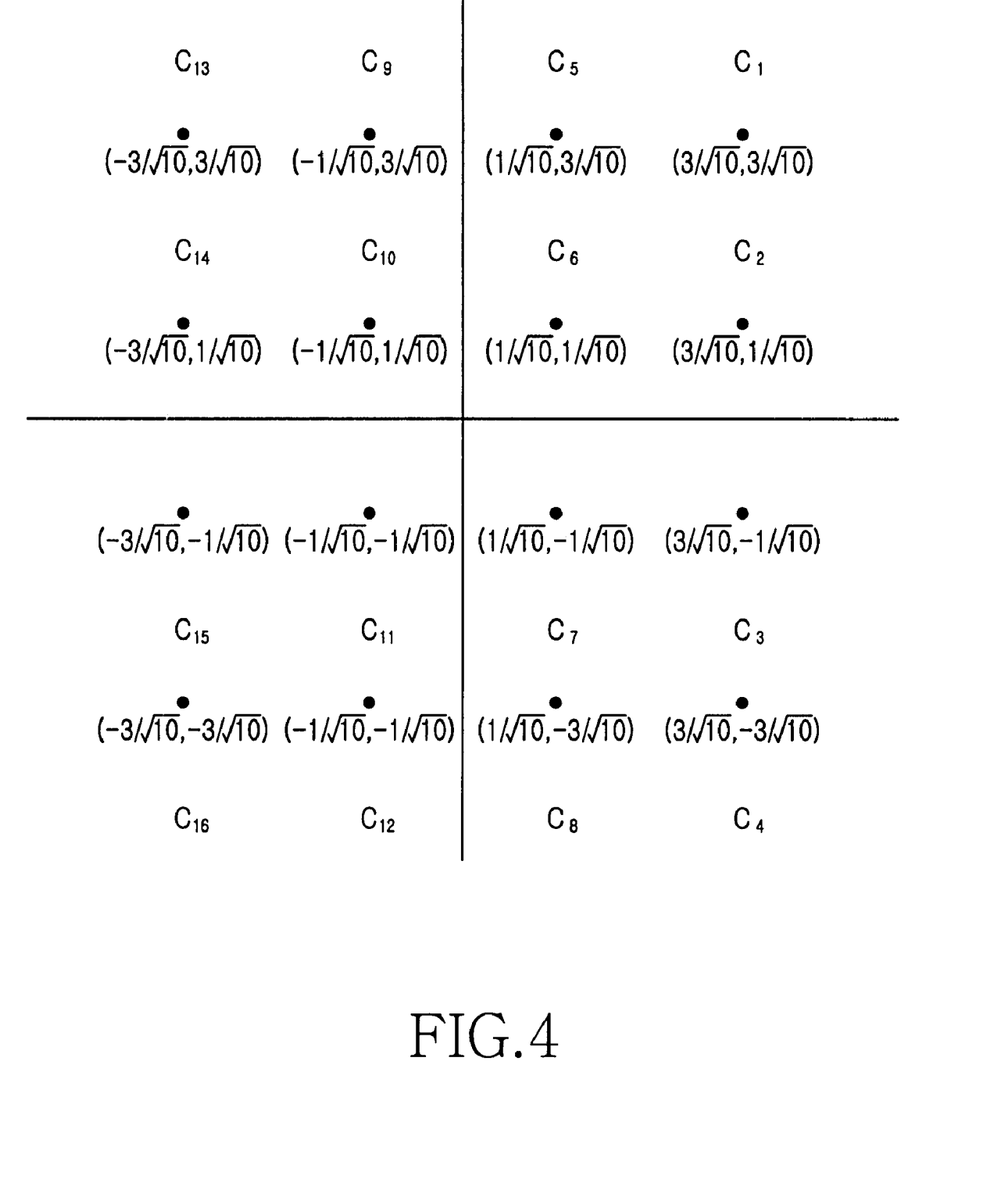
FIG. 4 is a view illustrating the 16QAM constellation used for QPSK modulation according to the first embodiment of the present invention.

FIG. 4 is a view illustrating the 16QAM constellation used for QPSK modulation according to the first embodiment of the present invention.

A mapping method to the 16QAM constellation according to the 16 cases is based on a 4-bit Gray coding scheme. Table 2 shows cases where a symbol is mapped to subcarriers in a group, and a transmission symbol determined according to each case. Here, the symbol is two bits long.

TABLE 2

| | | 1st subcarrier in $i^{th}$ group | 2nd subcarrier in $i^{th}$ group | transmission symbol |
|---|---|---|---|---|
| Case where same symbol is loaded on 1st and 2nd subcarriers | Case 1 | $S_{i,1,1}$ | $S_{i,2,1}$ | $C_{i,1}$ |
| | Case 2 | $S_{i,1,2}$ | $S_{i,2,2}$ | $C_{i,6}$ |
| | Case 3 | $S_{i,1,3}$ | $S_{i,2,3}$ | $C_{i,11}$ |
| | Case 4 | $S_{i,1,4}$ | $S_{i,2,4}$ | $C_{i,16}$ |
| Case where phase difference between symbols loaded on 1st and 2nd subcarriers is 90 degrees | Case 5 | $S_{i,1,1}$ | $S_{i,2,2}$ | $C_{i,2}$ |
| | Case 6 | $S_{i,1,2}$ | $S_{i,2,3}$ | $C_{i,7}$ |
| | Case 7 | $S_{i,1,3}$ | $S_{i,2,4}$ | $C_{i,12}$ |
| | Case 8 | $S_{i,1,4}$ | $S_{i,2,1}$ | $C_{i,13}$ |
| Case where phase difference between symbols loaded on 1st and 2nd subcarriers is 180 degrees | Case 9 | $S_{i,1,1}$ | $S_{i,2,3}$ | $C_{i,3}$ |
| | Case 10 | $S_{i,1,2}$ | $S_{i,2,4}$ | $C_{i,8}$ |
| | Case 11 | $S_{i,1,3}$ | $S_{i,2,1}$ | $C_{i,9}$ |
| | Case 12 | $S_{i,1,4}$ | $S_{i,2,2}$ | $C_{i,14}$ |
| Case where phase difference between symbols loaded on 1st and 2nd subcarriers is 270 degrees | Case 13 | $S_{i,1,1}$ | $S_{i,2,4}$ | $C_{i,4}$ |
| | Case 14 | $S_{i,1,2}$ | $S_{i,2,1}$ | $C_{i,5}$ |
| | Case 15 | $S_{i,1,3}$ | $S_{i,2,2}$ | $C_{i,10}$ |
| | Case 16 | $S_{i,1,4}$ | $S_{i,2,3}$ | $C_{i,15}$ |

Meanwhile, an error probability between symbols on a constellation is determined by the minimum distance between symbols. When it is assumed that power allocated for each symbol is "1," the minimum distance between symbols in the conventional BPSK modulation scheme is "2." However, the square of the minimum distance between symbols according to the first embodiment of the present invention is "2." Therefore, when a coherent detection is applied to two subcarriers at the same time by means of a maximum likelihood scheme, the same performance as that of the conventional BPSK modulation scheme is obtained. The coherent detection may be defined as shown in equation 3 below.

$$\hat{C}_i = \underset{c_i}{\operatorname{argmin}} \left[ \sum_{k=1}^{2} \{(R_k - H_k \cdot C_i)\}^2 \right] \quad (3)$$

In equation 3, the "$R_k$" represents a reception signal of a $k^{th}$ subcarrier, and the "$H_k$" represents a channel of the $k^{th}$ subcarrier.

However, in the frequency selective fading channel, channel states of subcarriers may be different. Therefore, as described with reference to the first embodiment of the present invention, it is possible to obtain a frequency diversity gain by grouping subcarriers outside a coherence band into one group, and transmitting symbols mapped to the grouped subcarriers as one modulation symbol by means of a new constellation.

Figure 5:
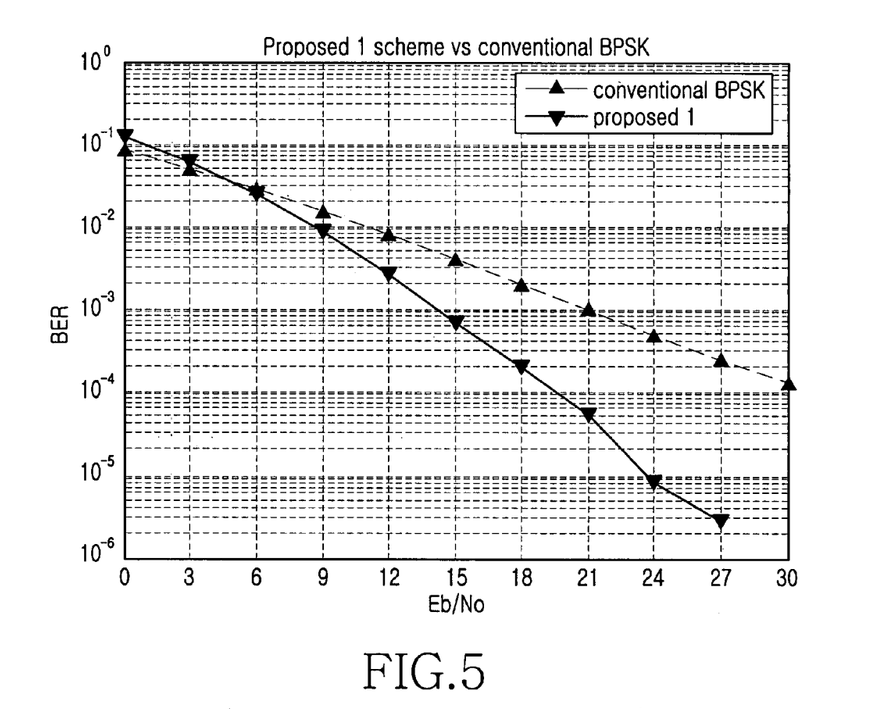
FIG. 5 is a graph illustrating a performance comparison between the conventional BPSK modulation scheme and the modulation scheme according to the first embodiment of the present invention.

FIG. 5 is a graph illustrating a performance comparison between the conventional BPSK modulation scheme and the modulation scheme according to the first embodiment of the present invention.

As test conditions, it is assumed that there are 1024 subcarriers, and that a multipath channel having 10 channel paths is used.

Meanwhile, according to the conventional QPSK modulation scheme, when the power per symbol is assumed to be "1," the minimum distance between symbols is 1.414 ($=\sqrt{2}$). However, according to the first embodiment of the present invention, when the power per symbol is assumed to be "1," the minimum distance between symbols is 0.8994. Therefore, it can be understood that, in an Additive White Gaussian Noise (AWGN) channel, the modulation scheme according to the first embodiment of the present invention exhibits performance superior to the conventional QPSK modulation scheme.

However, in the frequency selective fading channel, the ranking of the performance is reversed. That is, in a channel with a high noise, the conventional QPSK modulation scheme exhibits performance superior to the modulation scheme according to the first embodiment of the present invention because the minimum distance between symbols used in the conventional QPSK modulation scheme is relatively longer. Moreover, even in a channel in which the number of multiple paths is too small to obtain a frequency diversity gain, the performance of the modulation scheme according to the first embodiment of the present invention, rather than that of the conventional QPSK modulation scheme, may be deteriorated.

Hereinafter, a second embodiment of the present invention for solving the above problem will be described.

Figure 6:
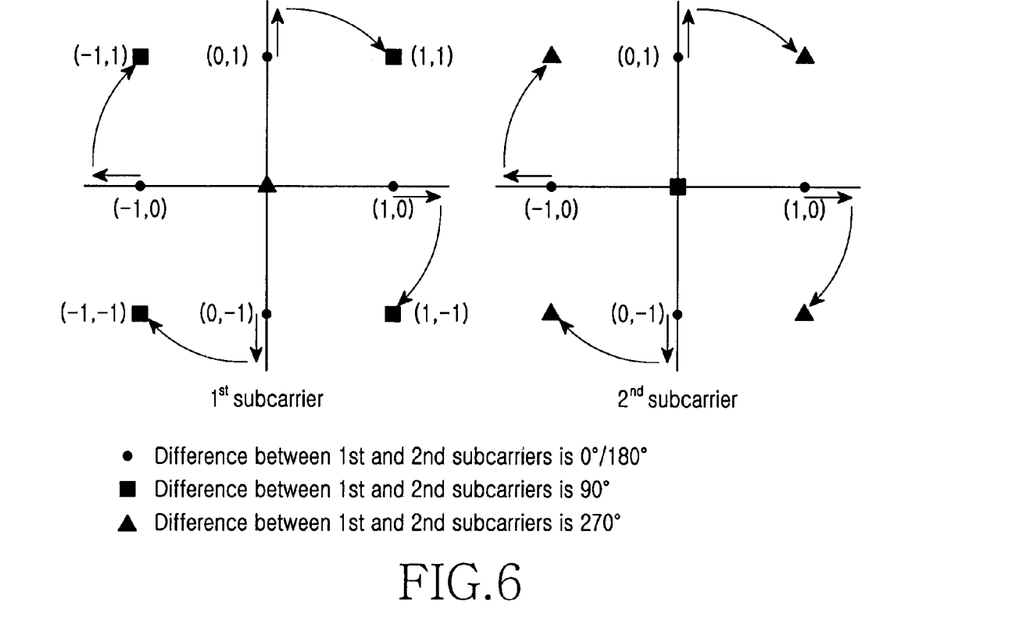
FIG. 6 is a view illustrating a constellation used for QPSK modulation according to a second embodiment of the present invention.

FIG. 6 is a view illustrating a constellation used for QPSK modulation according to the second embodiment of the present invention.

According to the second embodiment of the present invention, when the same information is loaded on respective subcarriers in a group, that is, when the phase distance between symbols is 0 degree, the subcarriers are mapped to different modulation symbols and are then transmitted.

When the phase distance between symbols is 90 degrees, the phase of a modulation symbol corresponding to a first subcarrier is shifted by 45 degrees, and power increases to double, before the subcarriers are transmitted. In this case, no modulation symbol is mapped to a second subcarrier.

When the phase distance between symbols is 180 degrees, the subcarriers are mapped to different modulation symbols and are then transmitted, similarly to the case where the phase distance between symbols is 0 degree.

When the phase distance between symbols is 270 degrees, any modulation symbol is not mapped to a first subcarrier, the phase of a modulation symbol corresponding to a second subcarrier is shifted by 45 degrees, and power increases to double, before the subcarriers are transmitted.

Table 3 shows a symbol map determined for each subcarrier in a group according to the second embodiment of the present invention.

TABLE 3

| | | 1st subcarrier in $i^{th}$ group | 2nd subcarrier in $i^{th}$ group | transmission symbol for 1st subcarrier | transmission symbol for 2nd subcarrier |
|---|---|---|---|---|---|
| Case where phase difference | Case 1 | $S_{i,1,1}$ | $S_{i,2,1}$ | $S_{i,1,1}$ | $S_{i,2,1}$ |
| | Case 2 | $S_{i,1,2}$ | $S_{i,2,2}$ | $S_{i,1,2}$ | $S_{i,2,2}$ |
| | Case 3 | $S_{i,1,3}$ | $S_{i,2,3}$ | $S_{i,1,3}$ | $S_{i,2,3}$ |

TABLE 3-continued

| | | 1st subcarrier in i<sup>th</sup> group | 2nd subcarrier in i<sup>th</sup> group | transmission symbol for 1st subcarrier | transmission symbol for 2nd subcarrier |
|---|---|---|---|---|---|
| between symbols loaded on 1st and 2nd subcarriers is 0 degree | Case 4 | $S_{i,1,4}$ | $S_{i,2,4}$ | $S_{i,1,4}$ | $S_{i,2,4}$ |
| Case where phase difference between symbols loaded on 1st and 2nd subcarriers is 90 degrees | Case 5 | $S_{i,1,1}$ | $S_{i,2,2}$ | $\sqrt{2}\,S_{i,1,1}\exp\left(\frac{j\pi}{4}\right)$ | 0 |
| | Case 6 | $S_{i,1,2}$ | $S_{i,2,3}$ | $\sqrt{2}\,S_{i,1,2}\exp\left(\frac{j\pi}{4}\right)$ | 0 |
| | Case 7 | $S_{i,1,3}$ | $S_{i,2,4}$ | $\sqrt{2}\,S_{i,1,3}\exp\left(\frac{j\pi}{4}\right)$ | 0 |
| | Case 8 | $S_{i,1,4}$ | $S_{i,2,1}$ | $\sqrt{2}\,S_{i,1,4}\exp\left(\frac{j\pi}{4}\right)$ | 0 |
| Case where phase difference between symbols loaded on 1st and 2nd subcarriers is 180 degrees | Case 9 | $S_{i,1,1}$ | $S_{i,2,3}$ | $S_{i,1,1}$ | $S_{i,2,3}$ |
| | Case 10 | $S_{i,1,2}$ | $S_{i,2,4}$ | $S_{i,1,2}$ | $S_{i,2,4}$ |
| | Case 11 | $S_{i,1,3}$ | $S_{i,2,1}$ | $S_{i,1,3}$ | $S_{i,2,1}$ |
| | Case 12 | $S_{i,1,4}$ | $S_{i,2,2}$ | $S_{i,1,4}$ | $S_{i,2,2}$ |
| Case where phase difference between symbols loaded on 1st and 2nd subcarriers is 270 degrees | Case 13 | $S_{i,1,1}$ | $S_{i,2,4}$ | 0 | $\sqrt{2}\,S_{i,2,4}\exp\left(\frac{j\pi}{4}\right)$ |
| | Case 14 | $S_{i,1,2}$ | $S_{i,2,1}$ | 0 | $\sqrt{2}\,S_{i,2,1}\exp\left(\frac{j\pi}{4}\right)$ |
| | Case 15 | $S_{i,1,3}$ | $S_{i,2,2}$ | 0 | $\sqrt{2}\,S_{i,2,2}\exp\left(\frac{j\pi}{4}\right)$ |
| | Case 16 | $S_{i,1,4}$ | $S_{i,2,3}$ | 0 | $\sqrt{2}\,S_{i,2,3}\exp\left(\frac{j\pi}{4}\right)$ |

Figure 7:
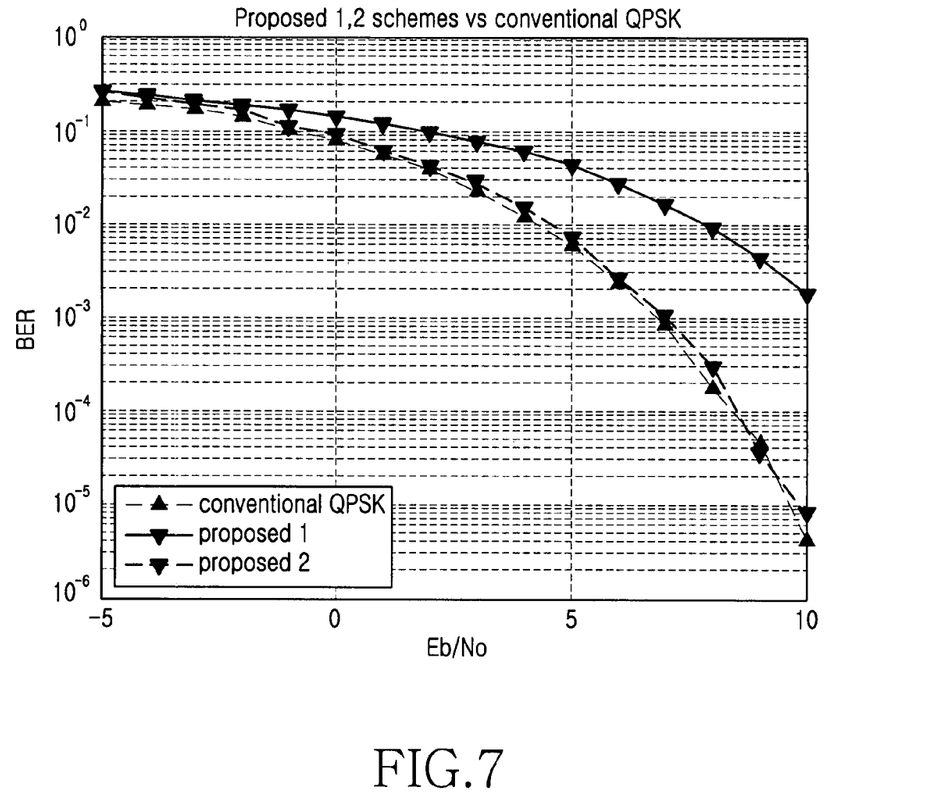
FIG. 7 is a graph illustrating a performance comparison between the modulation scheme according to the second embodiment of the present invention and the conventional QPSK modulation scheme.
Figure 8:
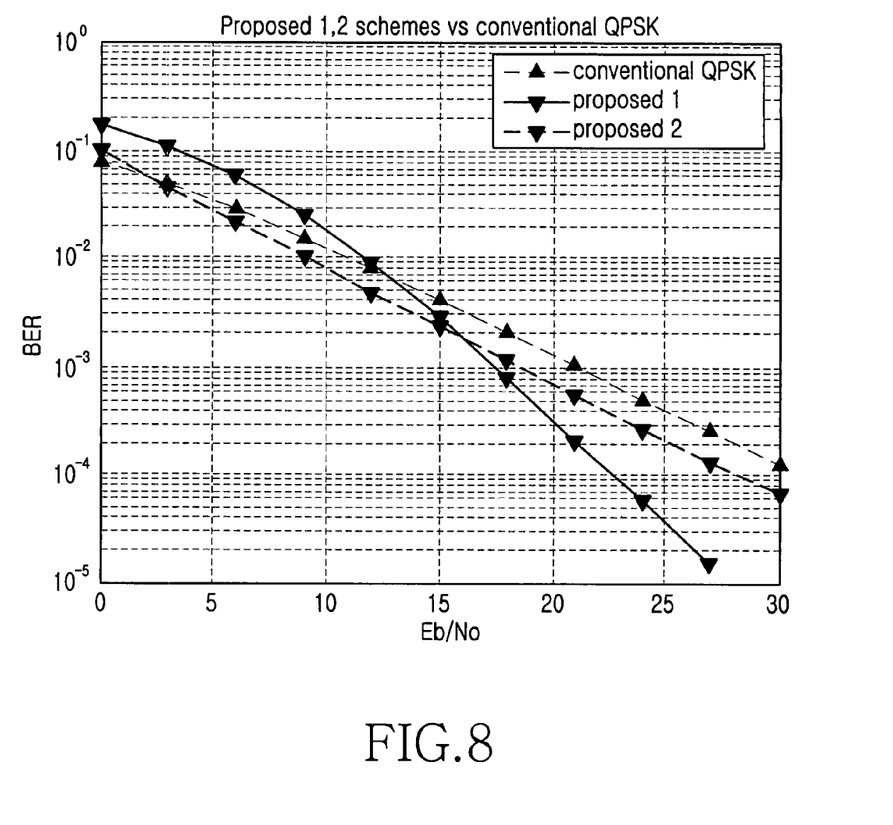
FIG. 8 is a graph illustrating a performance comparison between the conventional QPSK modulation scheme and the modulation schemes according to the first and second embodiments of the present invention.

As shown in FIG. 7, the modulation scheme according to the second embodiment of the present invention has the same performance as the conventional QPSK modulation scheme. In Table 3, transmission symbols in Cases 1, 2, 3, 4, 9, 10, 11, and 12 obtain diversity gains. Therefore, it can be understood that the modulation scheme according to the second embodiment of the present invention is superior to the conventional QPSK modulation scheme in terms of the overall performance, and does not show a deterioration in performance, even in a channel having a low Eb/No (i.e., in a high-noise environment).

Figure 9:
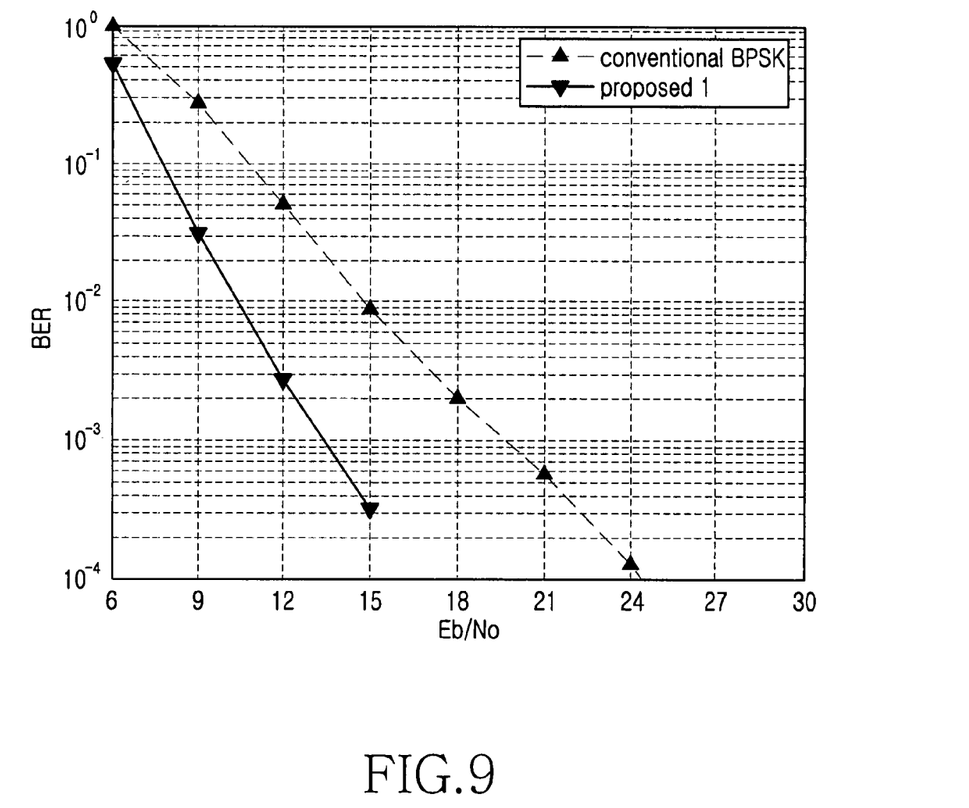
FIG. 9 is a graph illustrating a test result when channel coding according to the first and second embodiments of the present invention and the conventional scheme is performed.
Figure 10:
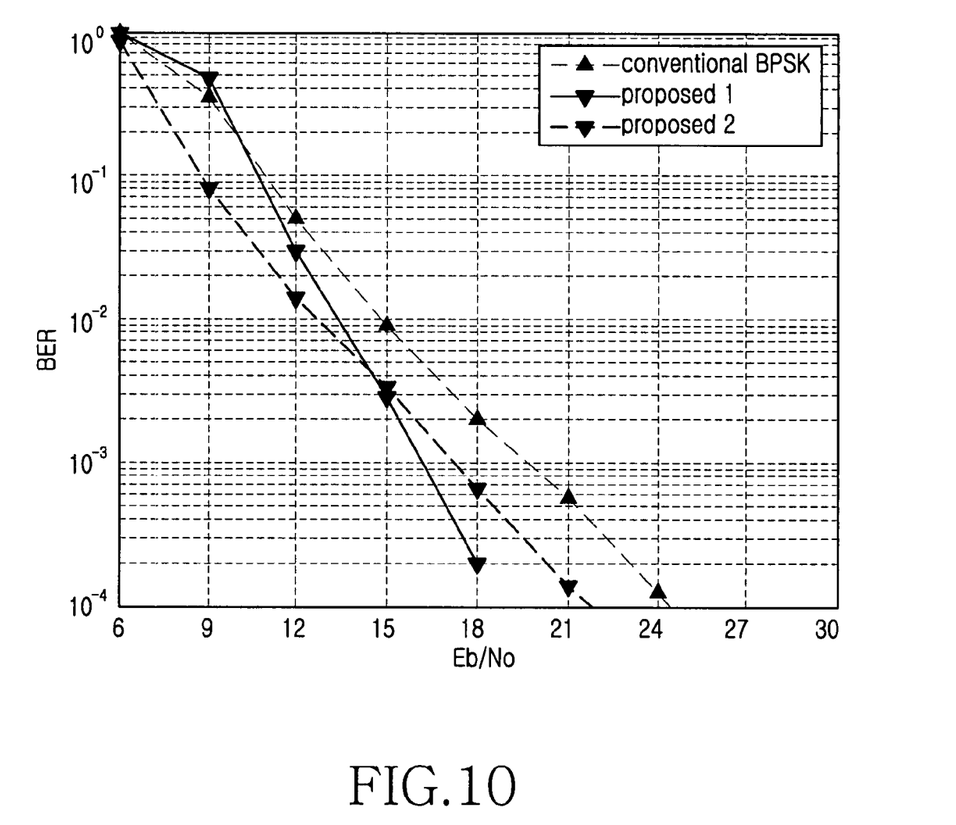
FIG. 10 is a graph illustrating a test result when channel coding according to the first and second embodiments of the present invention and the conventional scheme is performed.

FIGS. 9 and 10 are graphs illustrating test results when channel coding according to the first and second embodiments of the present invention and the conventional scheme is performed. The channel coding is performed in such a manner as to measure an error rate per frame, by means of a convolutional code (k=7, code rate=0.5) having an optimal polynomial.

Referring to FIG. 9, it can be understood that the BPSK modulation scheme according to the first embodiment of the present invention exhibits performance superior to the conventional BPSK modulation scheme, even when a channel coding is performed.

However, the conventional QPSK modulation scheme and the QPSK modulation schemes according to the first and second embodiments of the present invention exhibit different performances depending on channel states. That is, referring to FIG. 10, it can be understood that the modulation scheme according to the second embodiment of the present invention exhibits the best performance at a low Eb/No, while the modulation scheme according to the first embodiment of the present invention exhibits the best performance at a high Eb/No. This is because, as described above, in a channel having a low Eb/No, the minimum distance between symbols, rather than a diversity gain, exerts a large influence upon performance because of the effect of noise. Accordingly, the modulation scheme according to the second embodiment of the present invention, which can obtain a diversity gain while having the same minimum distance between symbols as the conventional QPSK modulation scheme, exhibits superior performance.

As described above, the present invention can enhance a diversity gain and can enhance the performance of the entire system, even without the addition of an antenna and/or a bandwidth.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a signal in a wireless communication system, the method comprising:
   grouping two subcarriers having different channel characteristics;
   identifying a number of all cases occurring when either equal symbols or different symbols, among symbols determined upon applying a first modulation scheme, are mapped to the two subcarriers; and mapping two subcarriers corresponding to each of the number of all cases to one symbol according to a second modulation scheme, and transmitting the signal, wherein a modulation order of the second modulation scheme is two times higher than a modulation order of the first modulation scheme.

2. The method as claimed in claim 1, wherein when a first symbol according to the first modulation scheme is mapped to a first subcarrier, and the first symbol according to the first modulation scheme is mapped to a second subcarrier, the first and second subcarriers are mapped to a first modulation symbol according to the second modulation scheme.

3. The method as claimed in claim 1, wherein when a second symbol according to the first modulation scheme is mapped to a first subcarrier, and the second symbol according to the first modulation scheme is mapped to a second subcarrier, the first and second subcarriers are mapped to a second modulation symbol according to the second modulation scheme.

4. The method as claimed in claim 1, wherein when a first symbol according to the first modulation scheme is mapped to a first subcarrier, and a second symbol according to the first modulation scheme is mapped to a second subcarrier, the first and second subcarriers are mapped to a third modulation symbol according to the second modulation scheme.

5. The method as claimed in claim 1, wherein when a second symbol according to the first modulation scheme is mapped to a first subcarrier, and a first symbol according to the first modulation scheme is mapped to a second subcarrier, the first and second subcarriers are mapped to a fourth modulation symbol according to the second modulation scheme.

6. The method as claimed in claim 1, wherein when the first modulation scheme includes quadrature phase shift keying (QPSK), and two subcarriers per group exist, a number of cases capable of mapping a symbol to each subcarrier is sixteen, as shown in a following table

| | | 1$^{st}$ subcarrier in i$^{th}$ group | 2$^{nd}$ subcarrier in i$^{th}$ group | transmission symbol |
|---|---|---|---|---|
| Case where same symbol is loaded on 1$^{st}$ and 2$^{nd}$ subcarriers | Case 1 | $S_{i,1,1}$ | $S_{i,2,1}$ | $C_{i,1}$ |
| | Case 2 | $S_{i,1,2}$ | $S_{i,2,2}$ | $C_{i,6}$ |
| | Case 3 | $S_{i,1,3}$ | $S_{i,2,3}$ | $C_{i,11}$ |
| | Case 4 | $S_{i,1,4}$ | $S_{i,2,4}$ | $C_{i,16}$ |
| Case where phase difference between symbols loaded on 1$^{st}$ and 2$^{nd}$ subcarriers is 90 degrees | Case 5 | $S_{i,1,1}$ | $S_{i,2,2}$ | $C_{i,2}$ |
| | Case 6 | $S_{i,1,2}$ | $S_{i,2,3}$ | $C_{i,7}$ |
| | Case 7 | $S_{i,1,3}$ | $S_{i,2,4}$ | $C_{i,12}$ |
| | Case 8 | $S_{i,1,4}$ | $S_{i,2,1}$ | $C_{i,13}$ |
| Case where phase difference between symbols loaded on 1$^{st}$ and 2$^{nd}$ subcarriers is 180 degrees | Case 9 | $S_{i,1,1}$ | $S_{i,2,3}$ | $C_{i,3}$ |
| | Case 10 | $S_{i,1,2}$ | $S_{i,2,4}$ | $C_{i,8}$ |
| | Case 11 | $S_{i,1,3}$ | $S_{i,2,1}$ | $C_{i,9}$ |
| | Case 12 | $S_{i,1,4}$ | $S_{i,2,2}$ | $C_{i,14}$ |
| Case where phase difference between symbols | Case 13 | $S_{i,1,1}$ | $S_{i,2,4}$ | $C_{i,4}$ |
| | Case 14 | $S_{i,1,2}$ | $S_{i,2,1}$ | $C_{i,5}$ |
| | Case 15 | $S_{i,1,3}$ | $S_{i,2,2}$ | $C_{i,10}$ |
| loaded on 1$^{st}$ and 2$^{nd}$ subcarriers is 270 degrees | Case 16 | $S_{i,1,4}$ | $S_{i,2,3}$ | $C_{i,15}$ | wherein "$S_{i,j,k}$" is defined by a following equation,
$S_{i,j,k}$: symbol k mapped to j$^{th}$ subcarrier in Group i $$i \in I, I = \left\{n \mid 1 \le n \le \frac{\text{total subcarrier}}{2}\right\}$$

$$j \in \{1, 2\}$$

$$k \in \{n \mid 1 \le n \le 2^{\text{modulation order}}\}, \text{ and}$$

the transmission symbol includes a modulation symbol based on a 16QAM modulation scheme.

7. The method as claimed in claim 1, wherein a symbol mapping with respect to the two subcarriers is performed by applying a Gray coding scheme.

8. A method for transmitting a signal in a wireless communication system, the method comprising:

grouping two subcarriers having different channel characteristics;

identifying a number of all cases occurring when either equal symbols or different symbols among symbols determined upon applying a quadrature phase shift keying (QPSK) modulation scheme are mapped to the two subcarriers;

when a phase difference between a first symbol mapped to a first subcarrier and a second symbol mapped to a second subcarrier according to the application of the QPSK modulation scheme is 90 degrees, transmitting a signal with no symbol mapped to the second subcarrier after shifting a phase of the first symbol by 45 degrees; and when a phase difference between the first symbol and the second subcarrier upon the application of the QPSK modulation scheme is 270 degrees, transmitting a signal with no symbol mapped to the first subcarrier after shifting a phase of the second symbol mapped to the second subcarrier by 45 degrees.

9. The method as claimed in claim 8, wherein a symbol having been phase-shifted is allocated with a power two or more times higher than that allocated to the symbol before the phase shift.

10. The method as claimed in claim 8, further comprising a step of, when equal symbols are mapped to the first and second subcarriers upon the application of the QPSK modulation scheme, transmitting the corresponding symbols as they are.

11. The method as claimed in claim 8, further comprising a step of, when a phase difference between symbols mapped to the first and second subcarriers upon the application of the QPSK modulation scheme is 180 degrees, transmitting the corresponding symbols as they are.

* * * * *